United States Patent
Cho (10) Patent No.: US 10,566,612 B2
(45) Date of Patent: Feb. 18, 2020

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: UNIST (ULSAN NATIONAL INSTITUTE OF SCIENCE AND TECHNOLOGY), Ulsan (KR)

(72) Inventor: Jaephil Cho, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 317 days.

(21) Appl. No.: 15/521,933

(22) PCT Filed: Jun. 15, 2015

(86) PCT No.: PCT/KR2015/006011
§ 371 (c)(1),
(2) Date: Apr. 26, 2017

(87) PCT Pub. No.: WO2016/068436
PCT Pub. Date: May 6, 2016

(65) Prior Publication Data
US 2017/0338473 A1      Nov. 23, 2017

(30) Foreign Application Priority Data

Oct. 27, 2014   (KR) .......................... 10-2014-0146331

(51) Int. Cl.
*H01M 4/36*      (2006.01)
*H01M 4/505*     (2010.01)
(Continued)

(52) U.S. Cl.
CPC .......... *H01M 4/366* (2013.01); *H01M 4/131* (2013.01); *H01M 4/1391* (2013.01);
(Continued)

(58) Field of Classification Search
None
See application file for complete search history.

(56) References Cited

FOREIGN PATENT DOCUMENTS

| CN | 104037407 | 9/2014 |
|---|---|---|
| EP | 2618405 | 7/2013 |

(Continued)

OTHER PUBLICATIONS

EPO, Office Action of the corresponding EP Patent Application No. 15853878.5, dated Mar. 22, 2018.
(Continued)

*Primary Examiner* — Carmen V Lyles-Irving
(74) *Attorney, Agent, or Firm* — Lex IP Meister, PLLC (57) ABSTRACT

A positive active material for a rechargeable lithium battery, a method of preparing the same, and a rechargeable lithium battery including the same are disclosed, and the positive active material for a rechargeable lithium battery includes: a layered lithium composite oxide core; a first coating layer on the surface of the core and magnesium doped at a lithium site in the core; a NiO-phase second coating layer on the first coating layer wherein the NiO-phase has a rock salt structure; and a third coating layer on the second coating layer and including lithium magnesium phosphate.

13 Claims, 8 Drawing Sheets

(51) Int. Cl.
*H01M 4/525* (2010.01)
*H01M 4/1391* (2010.01)
*H01M 4/131* (2010.01)
*H01M 4/58* (2010.01)
*H01M 10/0525* (2010.01)
*H01M 10/052* (2010.01)
*H01M 4/62* (2006.01)
*H01M 4/02* (2006.01)

(52) U.S. Cl.
CPC ........... *H01M 4/505* (2013.01); *H01M 4/525* (2013.01); *H01M 4/5825* (2013.01); *H01M 10/0525* (2013.01); *H01M 4/62* (2013.01); *H01M 10/052* (2013.01); *H01M 2004/028* (2013.01)

(56) References Cited

FOREIGN PATENT DOCUMENTS

| | | |
|---|---|---|
| JP | H9-82312 | 3/1997 |
| JP | 2008-130287 | 6/2008 |
| JP | 2011-138718 | 7/2011 |
| JP | 2012-038534 | 2/2012 |
| JP | 2012-221855 | 11/2012 |
| JP | 2013-191540 | 9/2013 |
| JP | 5391337 | 1/2014 |
| JP | 2015-069958 | 4/2015 |
| KR | 10-2007-0027985 | 3/2007 |
| KR | 10-2007-0119929 | 12/2007 |
| KR | 10-0889622 | 3/2009 |
| KR | 10-2012-0114896 | 10/2012 |
| KR | 10-2012-0121235 | 11/2012 |
| KR | 10-2013-0084616 | 7/2013 |
| KR | 10-2014-0058799 | 5/2014 |
| WO | 2006-123572 | 11/2006 |

OTHER PUBLICATIONS

Liu, Wen et al., "Countering Voltage Decay and Capacity Fading of Lithium-Rich Cathode Material at 60° C. by Hybrid Surface Protection Layers", Advanced Energy Materials, Apr. 2015, 1500274.

Hideyuki Morimoto et al., "Charge-discharge properties of LiCoO2 electrodes modfied by olivine-type compounds of LiMgPO4 for lithium secondary batteries", Journal of Power Sources, Apr. 2012, pp. 66-70.

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

BACKGROUND OF THE INVENTION (a) Field of the Invention

A method of preparing a positive active material for a rechargeable lithium battery and a positive active material for a rechargeable lithium battery are disclosed.

(b) Description of the Related Art

In recent times, portable electronic equipment with reduced size and weight has been increasingly used in accordance with development of electronic industries.

Batteries generate electrical power using an electrochemical reaction material for a positive electrode and a negative electrode. Lithium rechargeable batteries generate electrical energy due to chemical potential changes during intercalation/deintercalation of lithium ions at positive and negative electrodes.

The lithium rechargeable batteries include a material reversibly intercalating or deintercalating lithium ions during charge and discharge reactions as both positive and negative active materials, and are filled with an organic electrolyte or a polymer electrolyte between the positive and negative electrodes.

For the positive active material for a rechargeable lithium battery, metal oxide composites such as $LiCoO_2$, $LiMn_2O_4$, $LiNiO_2$, $LiMnO_2$, and the like are used. Among the positive active materials, a manganese-based positive active material such as $LiMn_2O_4$ and $LiMnO_2$ is easy to synthesize, costs less than other materials, has excellent thermal stability compared to other active materials, and is environmentally friendly. However, this manganese-based material has relatively low capacity.

$LiCoO_2$ has good electrical conductivity, a high cell voltage of about 3.7 V, and excellent cycle-life, stability, and discharge capacity, and thus is a presently-commercialized representative material. However, $LiCoO_2$ is so expensive that makes up more than 30% of the cost of a battery, and thus may reduce price competitiveness.

In addition, $LiNiO_2$ has the highest discharge capacity among the above positive active materials but is hard to synthesize. Furthermore, nickel therein is highly oxidized and may deteriorate the cycle-life of a battery and an electrode, and thus may have severe deterioration of self discharge and reversibility. Further, it may be difficult to commercialize due to incomplete stability.

As described above, conventional technologies have provided a positive active material for a rechargeable lithium battery including various coating layers in order to improve battery characteristics.

SUMMARY OF THE INVENTION

A positive active material for a rechargeable lithium battery having excellent high-capacity and high efficiency and cycle-life characteristics, and a rechargeable lithium battery including a positive electrode including the positive active material, are provided.

Hereinafter, embodiments of the present invention are described in detail.

However, these embodiments are exemplary, the present invention is not limited thereto, and the present invention is defined by the scope of claims.

In one embodiment of the present invention, a positive active material for a rechargeable lithium battery includes: a layered lithium composite oxide core; a first coating layer on the surface of the core and magnesium doped at a lithium site in the core; a NiO-phase second coating layer on the first coating layer wherein the NiO-phase has a rock salt structure; and a third coating layer on the second coating layer and including lithium magnesium phosphate.

In order to solve the problem of a conventional layered (specifically, Ni-based) positive electrode material, a surface structure extended to the inside along with a surface layer should be stabilized.

The surface structure is important to fortify, since all the reactions start from the surface.

Conventional technologies make an attempt to improve high temperature characteristics through simple formation of a surface coating layer, but expose many problems.

In addition, the surface coating layer has an influence on a rate limiting effect at room temperature and resultantly deteriorates performance. In order to solve this problem, the present invention forms a multi-layer on the surface.

Figure 1:
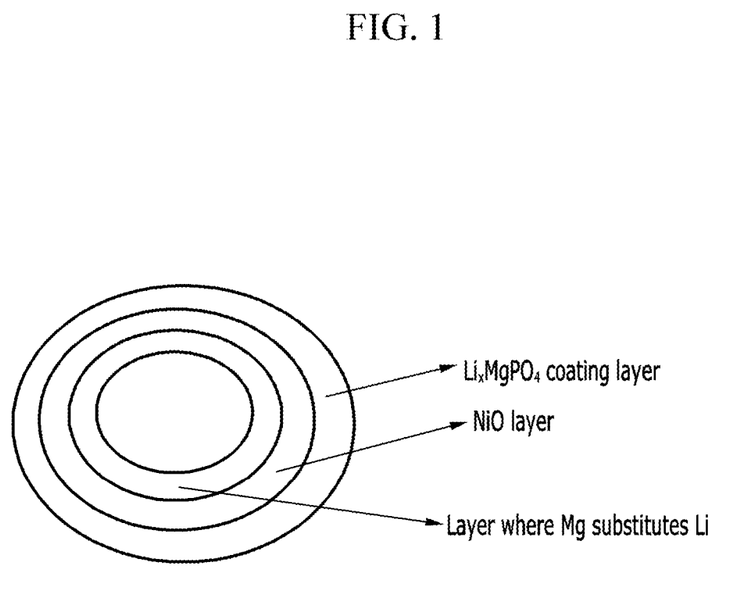
FIG. 1 is a schematic view showing a positive active material according to one embodiment of the present invention.
Figure 2:
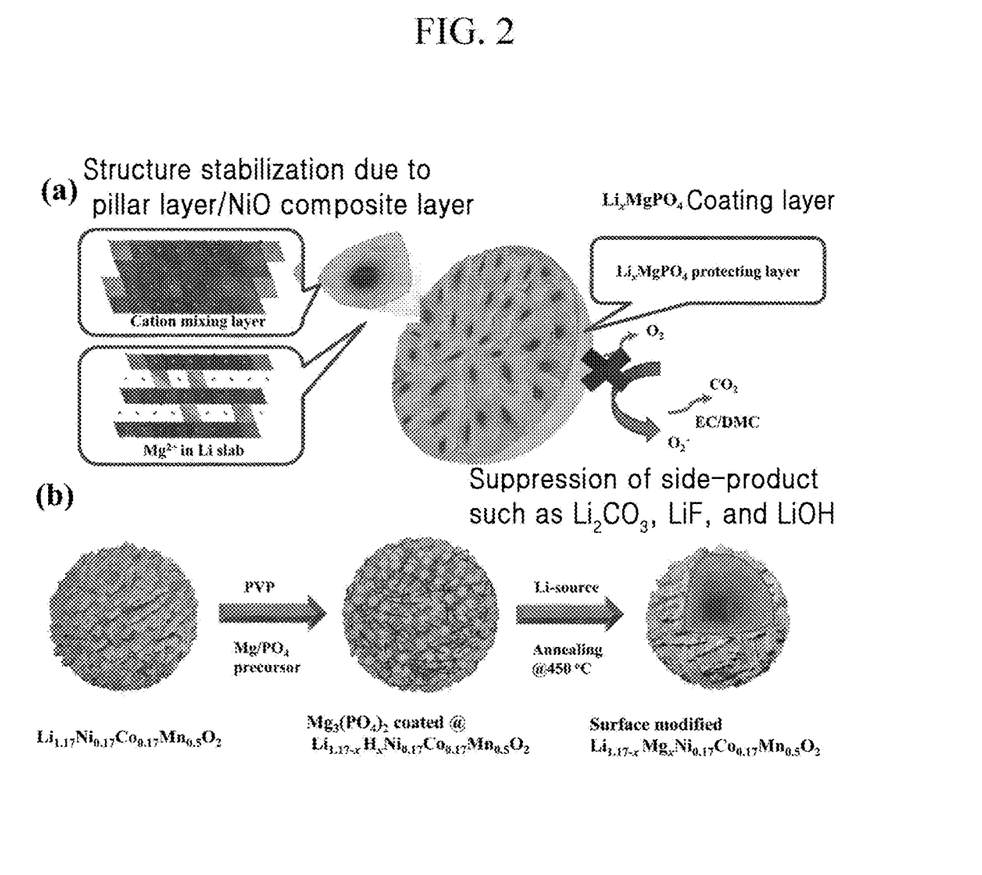
FIG. 2 is a schematic view showing a process of manufacturing a positive active material having a multi-layer coating structure according to one embodiment of the present invention.

FIG. 2 is a schematic view showing a process of manufacturing a positive active material having a multi-layer coating structure according to one embodiment of the present invention.

More specifically, the present invention forms a lithium magnesium phosphate coating layer and a NiO layer having a thickness of several nanometers to fortify structural stability on the surface.

Then, magnesium ions from the bottom of the NiO layer are permeated into the lithium layer during a coating process and minimize collapse of the multi-layer coating structure.

Accordingly, high temperature characteristics are improved by greater than or equal to 50% after coating compared with before the coating without deteriorating performance in a room temperature rate evaluation.

The core may be represented by Chemical Formula 1.

[Chemical Formula 1]

In Chemical Formula 1, M is a metal of Al, Zr, B, or a combination thereof, 0.98≤a≤1.2, 0.1≤b≤0.9, 0.1≤c≤1, 0.1≤d≤0.9, 0≤e≤0.05, and b+c+d+e=1.

More specifically, in Chemical Formula 1, 0.98≤a≤1.2, 0.1≤b≤0.9, 0.1≤c≤1, 0.1≤d≤0.9, 0≤e≤0.005, and b+c+d+e=1.

More specifically, in Chemical Formula 1, 0.98≤a≤1.2, 0.5≤b≤0.9, 0.1≤c≤1, 0.1≤d≤0.9, 0≤e≤0.005, and b+c+d+e=1.

More specifically, in Chemical Formula 1, 0.98≤a≤1.2, 0.1≤b≤0.5, 0.1≤c≤1, 0.1≤d≤0.9, 0≤e≤0.005, and b+c+d+e=1.

The ranges are exemplary of the present invention, and the present invention is not limited thereto.

The first coating layer may be represented by Chemical Formula 2.

[Chemical Formula 2]

In Chemical Formula 2, M is a metal of Al, Zr, B, or a combination thereof, 0.98≤a≤1.2, 0.1≤b≤0.9, 0.1≤c≤1, 0.1≤d≤0.9, 0≤e≤0.05, b+c+d+e=1, and 0.01≤x≤0.1.

More specifically, in Chemical Formula 2, 0.98≤a≤1.2, 0.1≤b≤0.9, 0.1≤c≤1, 0.1≤d≤0.9, 0≤e≤0.2, b+c+d+e=1, and 0.01≤x≤0.1.

More specifically, in Chemical Formula 2, 0.98≤a≤1.2, 0.1≤b≤0.9, 0.1≤c≤1, 0.1≤d≤0.9, 0≤e≤0.2, b+c+d+e=1, 0.01≤x≤0.1.

More specifically, in Chemical Formula 2, 0.98≤a≤1.2, 0.5≤b≤0.9, 0.1≤c≤1, 0.1≤d≤0.9, 0≤e≤0.2, b+c+d+e=1, and 0.01≤x≤0.1.

The third coating layer may be represented by Chemical Formula 3, but it is not limited thereto.

$$Li_aMgPO_4 \quad \text{[Chemical Formula 3]}$$

In Chemical Formula 1, 0.1≤a≤0.9.

The total amount of the first, second, and third coating layers may be greater than 0 wt % and less than or equal to 3 wt % based on 100 wt % of the total positive active material.

In this case, high temperature characteristics may be improved without a large decrease of initial capacity.

A thickness of the third coating layer may be greater than 0 nm and less than or equal to 10 nm. In this case, high temperature characteristics may be improved without a large decrease of initial capacity.

A thickness of the second coating layer may be greater than 0 nm and less than or equal to 10 nm. In this case, high temperature characteristics may be improved without a large decrease of initial capacity.

In the first coating layer, a doping amount of magnesium in a lithium site may be 1 to 10 mol %. High temperature characteristics may be improved without a large decrease of initial capacity.

The total thickness of the first, second, and third coating layers may be greater than 0 nm and less than or equal to 30 nm, but it is not limited thereto.

The positive active material may consist of spherically shaped secondary particles consisting of primary particles having a diameter of 100-500 nm.

The positive active material for a rechargeable lithium battery of the present invention may include the secondary particles having a diameter of 1 to 10 μm, wherein primary particles are aggregated to form the secondary particles.

In another embodiment of the present invention, a method of preparing a positive active material for a rechargeable lithium battery includes: mixing a layered lithium composite oxide core, a magnesium raw material, and a phosphate salt in a solvent and agitating the same to coat the magnesium phosphate compound on the surface of the core; and mixing the core coated with the magnesium phosphate compound and a lithium raw material and heat-treating the same to obtain a positive active material for a rechargeable lithium battery including a layered lithium composite oxide core, a first coating layer on the surface of the core and magnesium doped at a lithium site in the core, a NiO-phase second coating layer on the first coating layer, and a third coating layer on the second coating layer and including lithium magnesium phosphate.

The mixing a layered lithium composite oxide core, a magnesium raw material, and a phosphate salt in a solvent and agitating the same to coat the magnesium phosphate compound on the surface of the core may be performed at 30 to 90° C. Within the above range, a coating precursor may be effectively dispersed in a solvent even at a low temperature.

The mixing of a layered lithium composite oxide core, a magnesium raw material, and a phosphate salt in a solvent and agitating the same to coat the magnesium phosphate compound on the surface of the core may be performed for 1 to 3 h. Within the above range, uniform dispersion of the active material and the coating precursors may be promoted.

After the mixing of a layered lithium composite oxide core, a magnesium raw material, and a phosphate salt in a solvent and agitating the same to coat the magnesium phosphate compound on the surface of the core, the resultant may be further dried at 80 to 120° C. Through the drying step, solvents may be effectively removed before heat-treating at 300° C. or greater.

The mixing of the core coated with the magnesium phosphate compound and the lithium raw material and heat-treating the same to obtain the positive active material for a rechargeable lithium battery including a layered lithium composite oxide core, a first coating layer on the surface of the core and magnesium doped at a lithium site in the core, a NiO-phase second coating layer on the first coating layer, and a third coating layer on the second coating layer and including lithium magnesium phosphate may be performed at 400 to 700° C. Within the range, the coating materials react with lithium residues on the surface, such as lithium hydroxide, lithium carbonate, and the like, and remove these residues. In addition, the coating materials react with the surface of the primary particles and promote formation of a triple coating layer.

The mixing of the core coated with the magnesium phosphate compound and the lithium raw material and heat-treating the same to obtain the positive active material for a rechargeable lithium battery including a layered lithium composite oxide core, a first coating layer on the surface of the core and magnesium doped at a lithium site in the core, a NiO-phase second coating layer on the first coating layer, and a third coating layer on the second coating layer and including lithium magnesium phosphate may be performed for 3 to 8 h. Within the range, the coating materials react with lithium residues on the surface such as lithium hydroxide, lithium carbonate, and the like, and remove these residues. In addition, the coating materials react with the surface of the primary particles and promote formation of a triple coating layer.

During the mixing of a layered lithium composite oxide core, a magnesium raw material, and a phosphate salt in a solvent and agitating the same to coat the magnesium phosphate compound on the surface of the core, polyvinylpyrrolidone (PVP), polyethylene oxide, polyvinylchloride, or a combination thereof may be further dissolved in the solvent. This material plays a role of uniformly coating precursor materials on the surface of a positive electrode.

In another embodiment of the present invention, a rechargeable lithium battery includes a positive electrode including the positive active material for a rechargeable lithium battery according to the embodiment of the present invention, a negative electrode including a negative active material, and an electrolyte.

More specifically, the rechargeable lithium battery includes a positive electrode, a negative electrode, and an electrolyte, wherein the positive electrode includes a current collector and a positive active material layer formed on the current collector, and the positive active material layer includes the positive active material.

The positive active material is the same as the above-described embodiment of the present invention and its description is not additionally provided. The positive active material layer includes a binder and a conductive material.

The binder improves binding properties of positive active material particles with one another and with a current collector, and an example thereof may be polyvinylidene fluoride (PVDF), but it is not limited thereto.

The conductive material improves electrical conductivity of a negative electrode. Any electrically conductive material can be used as a conductive agent unless it causes a chemical change. Examples of the conductive material include a carbon-based material such as natural graphite, artificial graphite, carbon black, acetylene black, ketjen black, and carbon fiber, a metal-based material such as a metal powder or a metal fiber of copper, nickel, aluminum, silver, and the like, and a conductive polymer such as a polyphenylene derivative, or a mixture thereof.

The negative electrode includes a current collector and a negative active material layer formed on the current collector, and the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon (low temperature fired carbon), a hard carbon, a mesophase pitch carbonized product, fired coke, and the like.

The lithium metal alloy include lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may include Si, $SiO_x$ (0<x<2), a Si—Y alloy (wherein Y is selected from an alkali metal, an alkaline-earth metal, a Group 13 element, a Group 14 element, a transition metal, a rare earth element, and a combination thereof, and is not Si), and the like. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, and the like.

The negative active material layer may include a binder, and optionally a conductive material.

The binder may be a styrene-butadiene rubber, but is not limited thereto.

The conductive material improves electrical conductivity of a negative electrode. Any electrically conductive material can be used as a conductive agent unless it causes a chemical change. Examples of the conductive material include a carbon-based material such as natural graphite, artificial graphite, carbon black, acetylene black, ketjen black, and carbon fiber; a metal-based material such as a metal powder or a metal fiber of copper, nickel, aluminum, silver, and the like; and a conductive polymer such as a polyphenylene derivative; or a mixture thereof.

The current collector may be selected from a copper foil, a nickel foil, a stainless steel foil, a titanium foil, a nickel foam, a copper foam, a conductive polymer substrate coated with a metal, and a combination thereof.

The current collector may be Al, but is not limited thereto.

The negative electrode and the positive electrode may be manufactured by a method including mixing each active material, a conductive material, and a binder into an active material composition and coating the composition on a current collector. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The organic solvent may further include one selected from an ester-based, ether-based, ketone-based, or alcohol-based solvent, and an aprotic solvent.

The non-aqueous organic solvent may be used singularly or in a mixture. When the organic solvent is used in a mixture, the mixture ratio may be controlled in accordance with desirable battery performance.

The carbonate-based solvent is prepared by mixing a cyclic carbonate and a linear carbonate.

More specifically, examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When cycle-life improvement additives are further used, their use amount may be appropriately controlled.

The lithium salt is dissolved in an organic solvent, supplies lithium ions in a battery, basically operates the rechargeable lithium battery, and improves lithium ion transportation between positive and negative electrodes therein. Examples of the lithium salt may be $LiPF_6$ and the like.

The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

The rechargeable lithium battery may further include a separator between a negative electrode and a positive electrode. The separator includes polyethylene, polypropylene, or polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on its shape. In addition, it may be a bulk type and a thin film type depending on size. Structures and manufacturing methods for lithium ion batteries pertaining to this disclosure are well known in the art.

Accordingly, a positive active material having excellent battery characteristics and a rechargeable lithium battery including the same may be provided.

Hereinafter, examples of the present invention and comparative examples are described. These examples, however, should not in any sense be interpreted as limiting the scope of the present invention.

PREPARATION EXAMPLE: POSITIVE ACTIVE MATERIAL

Preparation Example 1 (Powder Synthesis Before Coating)

A $Li_{1.167}Ni_{0.167}Co_{0.167}Mn_{0.5}O_2$ positive electrode powder was prepared by dry-mixing 50 g of LiOH and 47 g of $Ni_{0.167}Co_{0.167}Mn_{0.5}(OH)_2$ powder and firing the mixture at 900° C. for 10 h.

The positive electrode powder consisted of a secondary particle shape obtained by agglomerating primary particles, and herein, the primary particle had a particle diameter ranging from 100 to 500 nm, and the secondary particle had a particle diameter of 10 μm.

Figure 7:
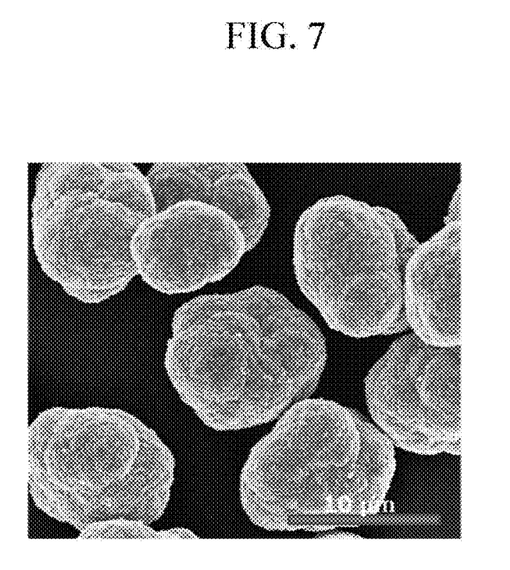
FIGS. 7 and 8 are SEM photographs of Preparation Example 1.
Figure 8:
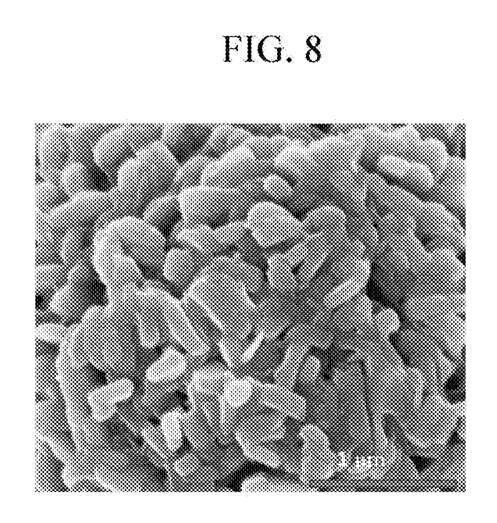

FIGS. 7 and 8 are SEM photographs showing the positive electrode powder of Preparation Example 1. The schematic particle diameters of the particles were examined.

Preparation Example 2

0.75 g of $Mg(NO_3)_2$ was dissolved in 30 g of water, and 0.1 g of polyvinylpyrrolidone (PVP) was dissolved therein. Then, 0.75 g of ammonium phosphate ($NH_4H_2PO_4$) along with 100 g of the $Li_{1.167}Ni_{0.167}Co_{0.167}Mn_{0.5}O_2$ positive electrode powder of Preparation Example 1 were added thereto, and the mixture was agitated at 60° C. for 2 h.

Next, the resultant was dried at 100° C. for 5 h and then dry-agitated with 0.75 g of lithium acetate and heat-treated at 450° C. for 5 h. (0.75 wt % of coating)

The coating layer was formed on the surface of the primary particle at a 5 nm thickness.

Preparation Example 3

1.5 g of $Mg(NO_3)_2$ was dissolved in 30 g of water, and then 0.2 g of polyvinylpyrrolidone (PVP) was dissolved therein. Then, 1.5 g of ammonium phosphate ($NH_4H_2PO_4$) and 100 g of the $Li_{1.167}Ni_{0.167}Co_{0.167}Mn_{0.5}O_2$ positive electrode powder (with a particle diameter of 5μ) were added thereto, and the mixture was agitated at 60° C. for 2 h. Next, the resultant was dried at 100° C. for 5 h and then dry-agitated with 0.75 g of lithium acetate, and the mixture was heat-treated at 450° C. for 5 h. (1.5 wt % of coating)

Preparation Example 4

3 g of $Mg(NO_3)_2$ was dissolved in 30 g of water, and then 0.2 g of polyvinylpyrrolidone (PVP) was dissolved therein. Then, 3 g of ammonium phosphate ($NH_4H_2PO_4$) along with 100 g of the $Li_{1.167}Ni_{0.167}Co_{0.167}Mn_{0.5}O_2$ positive electrode powder (with a particle diameter of 5 μm) were added thereto, and the mixture was agitated at 60° C. for 2 h. Next, the resultant was dried at 100° C. for 5 h and dry-agitated with 3 g of lithium acetate, and the mixture was heat-treated at 450° C. for 5 h. (3 wt % of coating)

Preparation Example 5

$LiNi_{0.8}Co_{0.1}Mn_{0.1}O_2$ powder was synthesized by dry-mixing 50 g of LiOH and 50 g of the $Ni_{0.8}Co_{0.1}Mn_{0.1}(OH)_2$ powder and firing the mixture at 800° C. for 15 h.

Preparation Example 6

The $LiNi_{0.8}Co_{0.1}Mn_{0.1}O_2$ powder was coated under the same conditions as Preparation Example 2 except for changing at a firing temperature into 600° C. for 5 h (0.75 wt % of coating).

Preparation Example 7

The $LiNi_{0.8}Co_{0.1}Mn_{0.1}O_2$ powder was coated under the same conditions as Preparation Example 3 except for changing at a firing temperature into 600° C. for 5 h (1 wt % of coating).

Preparation Example 8

50 g of LiOH and 50 g of $Ni_{0.5}Co_{0.2}Mn_{0.3}(OH)_2$ powder were dry-mixed and then fired at 800° C. for 15 h, synthesizing a $LiNi_{0.5}Co_{0.2}Mn_{0.3}O_2$ powder.

Preparation Example 9

The $LiNi_{0.5}Co_{0.2}Mn_{0.3}O_2$ powder was coated under the same conditions as Preparation Example 2 except for performing the firing at 600° C. for 5 h (0.75 wt % of coating).

Preparation Example 10

$LiNi_{0.5}Co_{0.2}Mn_{0.3}O_2$ powder was coated under the same conditions as Preparation Example 2 except for changing at a firing temperature of 600° C. for 5 h (1 wt % of coating).

Example and Comparative Example: Manufacture of Coin Cell 80 wt % of each positive active material according to Preparation Examples 1 to 10, 10 wt % of Super P as a conductive agent, and 10 wt % of PVDF as a binder were added to N-methyl-2 pyrrolidone (NMP) as a solvent, preparing a positive electrode slurry. The positive electrode slurry was coated to be 20 to 40 μm thick on an aluminum (Al) thin film as a positive electrode current collector, vacuum-dried, and roll-pressed, manufacturing a positive electrode.

As for a negative electrode, a Li-metal was used.

The positive electrode, the Li-metal as a counter electrode, and a 1.15 M $LiPF_6$ EC:EMC:DMC (3:4:3 vol %) as an electrolyte solution were used to manufacture a coin cell type half-cell.

A constant current charge and discharge experiment was performed regarding the cell, and herein, a C-rate used was 0.1 C or 20 C. The evaluation was performed at 24° C. and 60° C.

Experimental Example

Material Analysis

Figure 3:
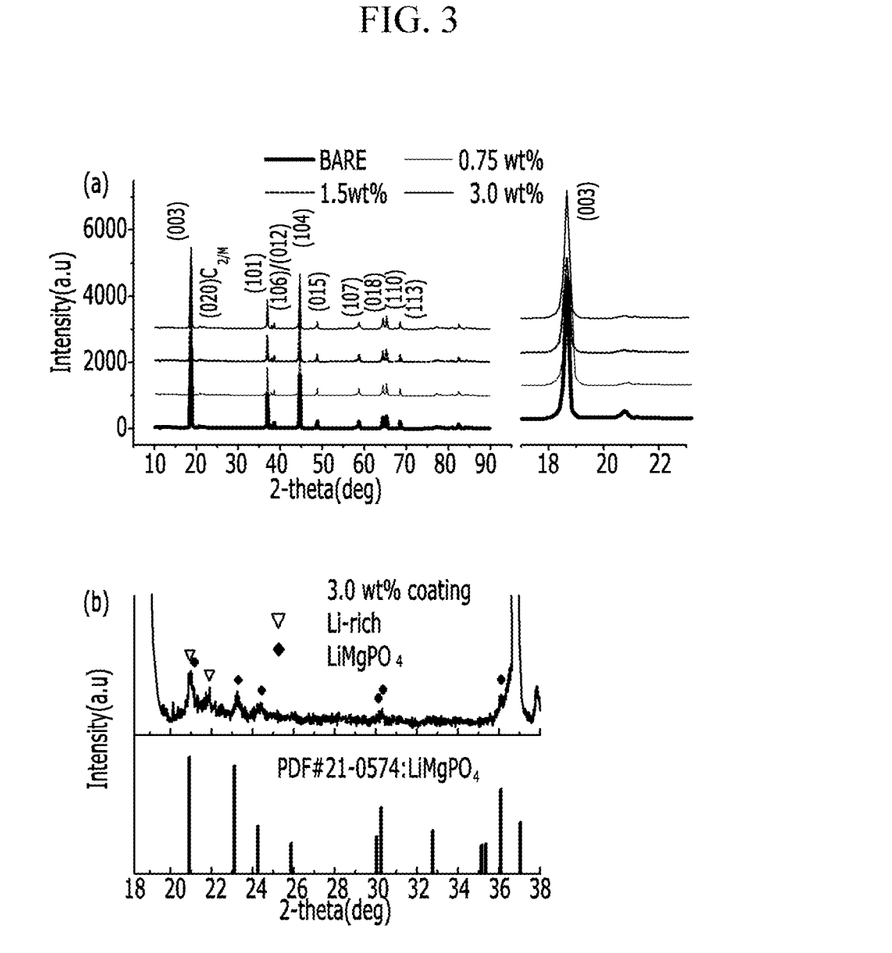
FIG. 3 shows the XRD analysis results of powders (3 wt %) according to Preparation Examples 1, 3, and 4.

FIG. 3 shows the XRD analysis results of the powders (0.75, 1.5, and 3 wt % before coating) according to Preparation Examples 1, 2, 3, and 4.

The powder (0.75, 1.5, and 3 wt % before coating) according to Preparation Examples 1, 2, 3, and 4 were XRD-analyzed, and the results show that $LiMgPO_4$ was formed. More specifically, this coating material was present with a degree of crystallinity on the surface.

Rietveld Analysis Result (Rietveld)

Tables 1 and 2 show Rietveld analysis results. XRD equipment and FullProf software were used for measurement.

The Rietveld analysis results show that the layered structure of a positive electrode material was well developed in all the materials. Particularly, Mg substitutes for Li at the Li site due to added Mg during the coating process (3a), and Mg substitutes at up to 0.6% with 1.5 wt % coating. When Mg substitutes for the Li site, the structure may be stabilized. A similar result to the above was found in Preparation Examples 5 to 10.

TABLE 1

|  | Structure | Preparation method 1 | Preparation method 2 | Preparation method 3 | Preparation method 4 |
|---|---|---|---|---|---|
| R-3m | Ni in Li (3a) (%) | 1 | 0.3 | 0.6 | 0.8 |
|  | Mg in Li (3b) | 0 | 0.7 | 0.6 | 1.86 |
| C2/m | Ni in Li (3a) (%) | 0 | 0.5 | 3 | 6.31 |
|  | Mg in Li (3b) | 0 | 0 | 1 | 0.89 |

TABLE 2

|  | Preparation method 5 | Preparation method 6 | Preparation method 7 | Preparation method 8 | Preparation method 9 | Preparation method 10 |
|---|---|---|---|---|---|---|
| Ni in Li (3a) (%) | 2 | 1.5 | 1 | 1.5 | 1 | 0.6 |
| Mg in Li (3b) | 0 | 0.4 | 0.6 | 0 | 0.3 | 0.5 |

EDX (Energy Dispersive X-Ray) of TEM Analysis Result

Figure 4:
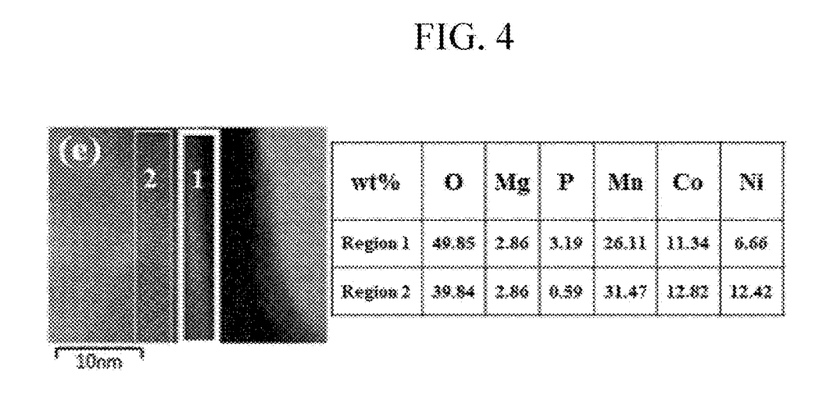
FIG. 4 shows EDX (energy dispersive X-ray) analysis of TEM photographs of Preparation Example 3.

FIG. 4 shows the EDX (energy dispersive X-ray) analysis of TEM of Preparation Example 3.

The EDX (energy dispersive X-ray) analysis of TEM was used to analyze the amount of elements in a positive electrode surface layer, and showed that a $Li_xMgPO_4$ layer was formed where Mg coexisted with P on the surface layer and was simultaneously diffused into the surface layer, while the P was present on the surface.

High Resolution TEM Photograph Analysis Result

Figure 5:
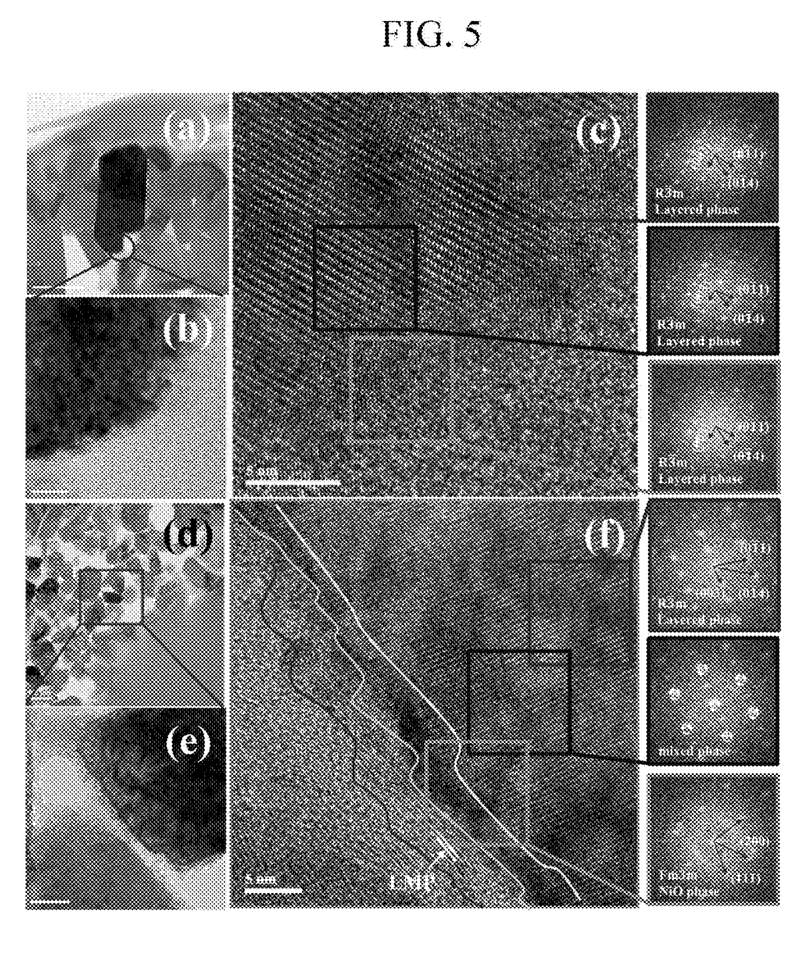
FIG. 5 shows high resolution TEM photograph analysis results of Preparation Example 3.

FIG. 5 shows resolution of the TEM photograph analysis result of Preparation Example 3.

As aforementioned, Preparation Example 3 showed a layered structure in three regions on the surface before coating whereas a layered structure (a red region) therein-side and a mixture of a NiO phase found in a green region and a layer phase (layered) in a blue region was shown after the coating (1.5 wt %). In addition, a $LiMgPO_4$ phase was randomly arranged as a small crystalline structure on the outer surface.

Electrochemical Characteristic Evaluation (Room Temperature of 24° C., 4.7V-2V)

Tables 3 and 4 show electrochemical characteristic evaluation results at room temperature.

The coated powder showed excellent characteristics such as initial efficiency and capacity retention at room temperature compared with a bare material.

In addition, a 1.5 wt % coated product among coated products and a bare product showed almost equivalent characteristics when their capacities up to 20 C discharge were compared.

TABLE 3

| 4.7 V-2 V | Preparation method 1 | Preparation method 2 | Preparation method 3 | Preparation method 4 |
|---|---|---|---|---|
| Initial charge capacity | 342 | 307 | 305 | 297 |
| Initial discharge capacity | 254 | 258 | 255 | 254 |
| Initial efficiency | 74 | 84 | 84 | 85 |
| 100$^{th}$ capacity | 146 | 153 | 150 | 157 |
| Capacity retention (%) | 82 | 84 | 84 | 83 |

TABLE 4

Preparation methods 5 to 10 include 100 charges and discharges at 1 C at room temperature.

| 4.3 V-3 V | Preparation method 5 | Preparation method 6 | Preparation method 7 | Preparation method 8 | Preparation method 9 | Preparation method 10 |
|---|---|---|---|---|---|---|
| Initial charge capacity | 213 | 211 | 211 | 194 | 194 | 193 |
| Initial discharge capacity | 190 | 188 | 188 | 175 | 175 | 174 |
| Initial efficiency | 89 | 89 | 89 | 90 | 90 | 90 |

TABLE 4-continued

Preparation methods 5 to 10 include 100 charges and discharges at 1 C at room temperature.

| 4.3 V-3 V | Preparation method 5 | Preparation method 6 | Preparation method 7 | Preparation method 8 | Preparation method 9 | Preparation method 10 |
|---|---|---|---|---|---|---|
| 100$^{th}$ capacity | 150 | 165 | 175 | 160 | 167 | 170 |
| Capacity retention (%) | 79 | 88 | 93 | 91 | 95 | 98 |

Electrochemical Characteristic Evaluation (High Temperature of 60° C., 1 C, 4.7 V-2 V)

Figure 6:
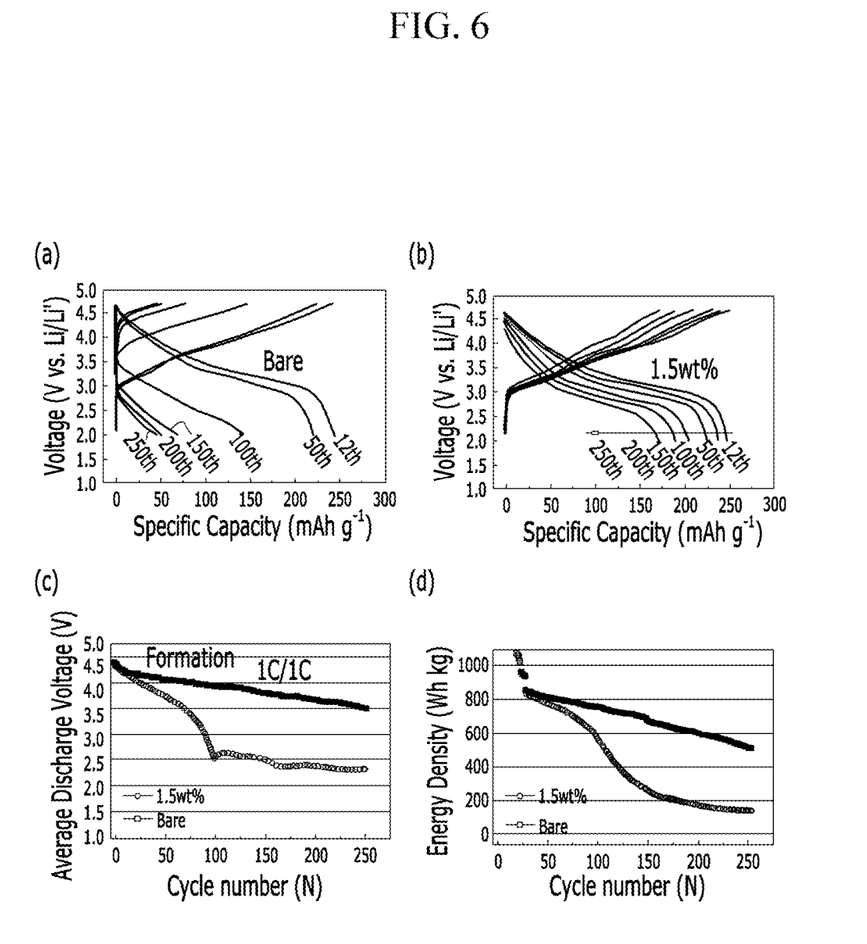
FIG. 6 shows 60° C. high temperature evaluation results of Example 1 (bare) and Example 3 (1.5 wt %).

FIG. 6 shows 60° C. high temperature evaluation results of Example 1 (bare) and Example 3 (1.5 wt %). In FIG. 6, (a) is data of Example 1 and (c) is data of Preparation Example 3.

The 60° C. high temperature evaluation result showed that the coating product had improved cycle-life capacity retention at the 250$^{th}$ cycle of 52% compared with the bare product.

In addition, as shown in (c) and (d) of FIG. 6, the coating product showed improved capacity retention characteristics at an average voltage of greater than or equal to 80% and remarkably improved energy density of up to 560 Wh/kg compared with 180 Wh/kg.

As shown in the results, a coating layer having a multi-layered structure on the surface of a positive electrode increased structural stability and improved high temperature characteristics of greater than or equal to 50%.

Accordingly, this improvement may lead to improved high temperature characteristics, one of the most important characteristics of a battery for an electric vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A positive active material for a rechargeable lithium battery, comprising:
   a layered lithium composite oxide core;
   a first coating layer on the surface of the core, the first coating layer comprising the layered lithium composite oxide comprised in the core being doped with magnesium at a lithium site;
   a NiO-phase second coating layer on the first coating layer wherein the NiO-phase has a rock salt structure; and
   a third coating layer on the second coating layer, the third coating layer comprising lithium magnesium phosphate.

2. The positive active material of claim 1, wherein the core is represented by Chemical Formula 1:

$Li_aNi_bCO_cMn_dM_eO_2$ [Chemical Formula 1]

wherein, in Chemical Formula 1, M is a metal of Al, Zr, B or a combination thereof, 0.98≤a≤1.2, 0.1≤b≤0.9, 0.1≤c≤1, 0.1≤d≤0.9, 0≤e≤0.05, and b+c+d+e=1.

3. The positive active material of claim 1, wherein the first coating layer is represented by Chemical Formula 2:

$Li_{a-x}Mg_xNi_bCo_cMn_dM_eO_2$ [Chemical Formula 2]

wherein, in Chemical Formula 2, M is a metal of Al, Zr, B or a combination thereof, 0.98≤a≤1.2, 0.1≤b≤0.9, 0.1≤c≤0.9, 0≤e≤0.05, b+c+d+e=1, and 0.01≤x≤0.1.

4. The positive active material of claim 1, wherein the third coating layer is represented by Chemical Formula 3:

$Li_aMgPO_4$ [Chemical Formula 3]

wherein, in Chemical Formula 1, 0.1≤a≤0.9.

5. The positive active material of claim 1, wherein the total amount of the first, second, and third coating layers is greater than 0 wt % and less than or equal to 3 wt % based on 100 wt % of the total positive active material.

6. The positive active material of claim 1, wherein a thickness of the third coating layer is greater than 0 nm and less than or equal to 10 nm.

7. The positive active material of claim 1, wherein a thickness of the second coating layer is greater than 0 nm and less than or equal to 10 nm.

8. The positive active material of claim 1, wherein in the first coating layer, a doping amount of magnesium in a lithium site is less than or equal to 1.9 mol %.

9. The positive active material of claim 1, wherein the total thickness of the first, second, and third coating layers may be greater than 0 nm and less than or equal to 500 nm.

10. The positive active material of claim 1, wherein the positive active material has a primary particle shape, and the primary particle has a diameter of less than or equal to 500 nm.

11. The positive active material of claim 10, wherein the primary particles are aggregated to form a secondary particle, and the secondary particle has a diameter of 1 to 10 μm.

12. The positive active material of claim 11, which further comprises a fourth coating layer comprising the lithium magnesium phosphate on the surface of the secondary particle.

13. A rechargeable lithium battery comprising:
   a positive electrode including the positive active material for rechargeable lithium battery of claim 1;
   a negative electrode including a negative active material; and
   an electrolyte.

* * * * *